(12) United States Patent  (10) Patent No.: US 9,198,077 B2
Park  (45) Date of Patent: Nov. 24, 2015

(54) SYSTEM AND METHOD FOR SATELLITE COMMUNICATION

(71) Applicant: Electronics and Telecommunications Research Institute, Daejeon (KR)

(72) Inventor: Man Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 92 days.

(21) Appl. No.: 14/080,751

(22) Filed: Nov. 14, 2013

(65) Prior Publication Data

US 2014/0133306 A1 May 15, 2014

(30) Foreign Application Priority Data

Nov. 15, 2012 (KR) ........................ 10-2012-0129583

(51) Int. Cl.
*H04W 28/02* (2009.01)
*H04L 12/801* (2013.01)
*H04L 12/807* (2013.01)

(52) U.S. Cl.
CPC ......... *H04W 28/0289* (2013.01); *H04L 47/196* (2013.01); *H04L 47/27* (2013.01); *H04W 28/0273* (2013.01)

(58) Field of Classification Search
None
See application file for complete search history.

(56) References Cited

U.S. PATENT DOCUMENTS

| 2008/0025216 A1* | 1/2008 | Singh et al. | 370/231 |
| 2008/0181108 A1* | 7/2008 | Hashmi et al. | 370/231 |
| 2013/0051693 A1* | 2/2013 | Ryu et al. | 382/239 |

OTHER PUBLICATIONS

G. Gardikis et al., "A Cross-Layer Rate Control Mechanism for Link-Adaptive Satellite Integrated Services", Research Letters in Communications, 2007, pp. 1-4, vol. 2007, Article ID 85937, Hindawi Publishing Corporation.

* cited by examiner

*Primary Examiner* — Michael Thier
*Assistant Examiner* — Feben M Haile

(57) ABSTRACT

A system and method for satellite communication that receives channel status information (CSI) of a forward link connected to a subscriber terminal station, resets a modulation and coding (MODCOD) of a physical layer based on the received CSI, and changes a congestion window value of a transmission layer based on the reset value of the reset MODCOD of the physical layer is provided.

18 Claims, 6 Drawing Sheets

SYSTEM AND METHOD FOR SATELLITE COMMUNICATION

CROSS-REFERENCE TO RELATED APPLICATION

This application claims the priority benefit of Korean Patent Application No. 10-2012-0129583, filed on Nov. 15, 2012, in the Korean Intellectual Property Office, the disclosure of which is incorporated herein by reference.

BACKGROUND

1. Field of the Invention

The present invention relates to a system for satellite communication using a performance enhancing proxy (PEP).

2. Description of the Related Art

In a system for satellite communication, hereinafter referred to as a "satellite communication system", modem technology of a wireless link layer as well as transmission control protocol (TCP) technology of a transmission layer may need to be optimized to a satellite link to provide a high quality satellite communication service, using a satellite link having a long delay time and a high packet loss rate.

An adaptive coding and modulation (ACM) scheme may be applied to a forward link of a physical layer in order to optimize a satellite link. The ACM scheme may be used in a point-to-point link connected by a single transceiver, and provide technology for providing a high bandwidth efficiency in a general environment of a satellite channel that varies over a course of time.

However, there is a desire for technology for enhancing unnecessary performance degradation in a TCP transmission because a satellite forward link faces an issue in terms of a TCP congestion window not being actively synced in response to an ACM operation.

SUMMARY

According to an aspect of the present invention, there is provided a system for satellite communication, the system including a resource management unit to receive channel status information (CSI) of a forward link connected to a subscriber terminal station, and reset a modulation and coding (MODCOD) of a physical layer, based on the CSI received, and a control unit to change a congestion window value of a transmission layer, based on the reset MODCOD of the physical layer.

The forward link may be a satellite wireless link to which an adaptive coding and modulation (ACM) scheme is applied.

The physical layer may include a transmission unit to transmit data to the subscriber terminal station via the forward link connected to the subscriber terminal station.

The transmission layer may include a transmission control protocol (TCP) to which a performance enhancing proxy (PEP) scheme is applied.

The system for satellite communication may further include a reception unit to receive the CSI from the subscriber terminal station via a return link connected to the subscriber terminal station.

The CSI may measure a quality status of the forward link by the subscriber terminal station.

The resource management unit may transmit data to the physical layer through selecting a new channel of the transmission layer when the data is received via a backbone data server.

The physical layer may receive an MODCOD corresponding to a channel status of the forward link from the resource management unit, and select a channel transmitting the data, based on the MODCOD.

The transmission layer may measure a capacity of a network through applying a slow start scheme.

According to an aspect of the present invention, there is provided a method for controlling a system for satellite communication, the method including receiving channel status information (CSI) of a forward link connected to a subscriber terminal station, resetting a modulation and coding (MODCOD) of a physical layer, based on the CSI received, and changing a congestion window value of a transmission layer, based on the reset MODCOD of the physical layer.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
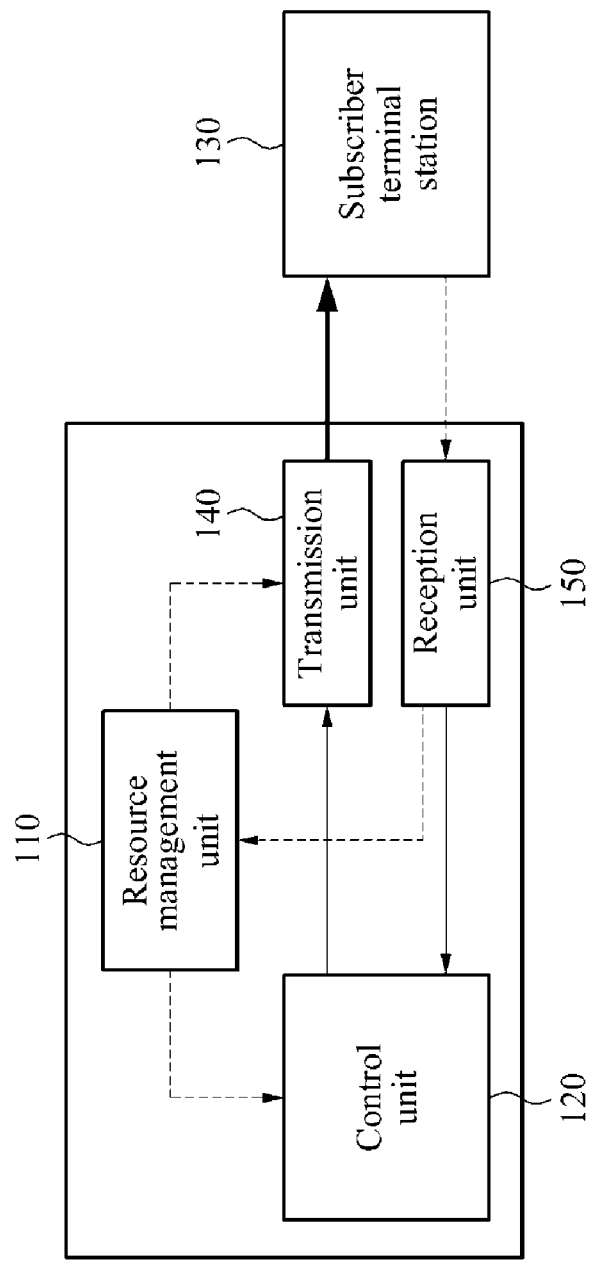
FIG. 1 is a block diagram illustrating a configuration of a system for satellite communication, hereinafter referred to as a "satellite communication system", according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a configuration of a system for satellite communication, hereinafter referred to as a satellite communication system, according to an embodiment of the present invention.

Referring to FIG. 1, the satellite communication system may include a resource management unit 110 and a control unit 120.

The resource management unit 110 may receive channel status information of a forward link connected to a subscriber terminal station 130, and reset a modulation and coding (MODCOD) of a physical layer, based on the received channel status information. Also, the control unit 120 may change a congestion window value of a transmission layer, based on the reset MODCOD of the physical layer.

The resource management unit 110 may correspond to a dynamic resource management system, and generate an MODCOD and channel information based on channel status information (CSI), for example, a signal noise ratio (SNR), of a forward link transmitted via a return link, and transmit the MODCOD and the channel information to a related apparatus, for example, a module.

The control unit 120 may correspond to a performance enhancing proxy (PEP) server, manage a transmission layer protocol, a transmission control packet (TCP), and control a congestion window value in a satellite TCP interval.

According to an aspect of the present invention, an adaptive coding and modulation (ACM) scheme may be applied to a forward link. For example, the forward link may maintain a packet loss rate to a predetermined degree as a quality of link of a corresponding wireless link may vary based on a change of the weather and an MODCOD value appropriate for the change of the quality of link may be applied to the forward link.

The ACM scheme may have a fixed symbol rate, and transmit differing data through multiplexing, using a time division multiplexing (TDM) scheme.

Figure 2:
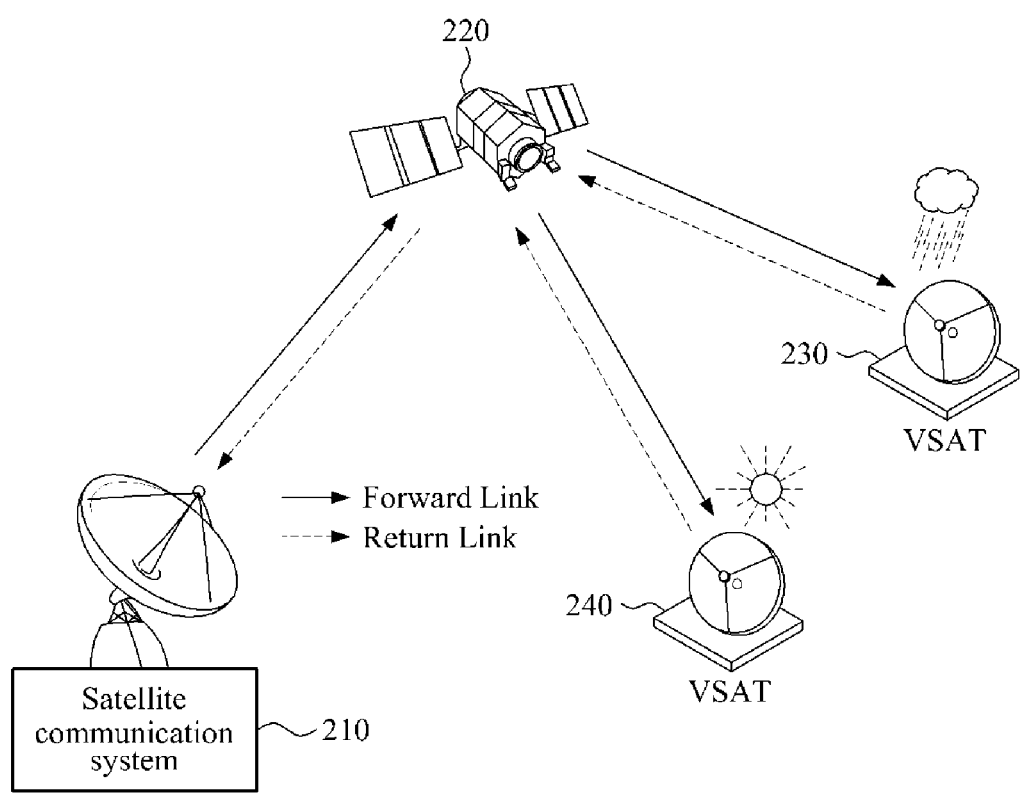
FIG. 2 is a diagram illustrating a structure of a satellite communication system to which an adaptive coding and modulation (ACM) scheme is applied according to an embodiment of the present invention.

FIG. 2 is a diagram illustrating a structure of a satellite communication system 210 to which an ACM scheme is applied according to an embodiment of the present invention.

For example, a coding rate and a modulation scheme of the satellite communication system 210 to which the ACM scheme is applied may vary on a frame by frame basis, and transmit/receive data via a bidirectional link, for example, a forward link and a return link, connected by a satellite 220.

An operation scheme of the satellite communication system 210 to which the ACM scheme is applied may measure a status of a channel in terrestrial satellite terminal stations, for example, very small aperture terminals (VSATs) 230 and 240, and transmit the status of the channel via the return link, as shown in FIG. 2. Also, a hub system, for example, the satellite communication system 210 of FIG. 2, may determine a most appropriate MODCOD using received information, and transmit data through encoding and modulating the data in a corresponding code rate and a modulation scheme.

The satellite communication system 210 to which the ACM scheme is applied may transmit data using a high MODCOD when a location at which a satellite terminal station is installed is in a good climate status 240, and may increase a data average throughput and a link availability by actively changing and transmitting data using a low MODCOD in a bad climate status 230 due to rain, and the like.

Referring to FIG. 1, the satellite communication system 210 may further include a transmission unit 140 to transmit data to the subscriber terminal station 130 via a forward link connected to the subscriber terminal station 130 in a physical layer. Also, a transmission layer may include a TCP to which a PEP is applied.

The transmission unit 140 may correspond to a forward link modem, and perform a data transmission on a wireless link connecting from the hub system to a subscriber terminal station, for example, a VSAT, in a satellite network.

The satellite communication system 210 may further include a reception unit 150 to receive CSI from the subscriber terminal station 130 via the return link connected to the subscriber terminal station 130. Here, the CSI may refer to information measuring a quality status of the forward link by the subscriber terminal link 130.

The reception unit 150 may correspond to a return link modem, and perform a data reception via a wireless link connected to the hub system in the VSAT in the satellite network.

For example, the return link may refer to a link through which user data is transmitted to the satellite communication system 210 from the subscriber terminal station 130, receive data transmitted via the forward link, and measure a status of a corresponding forward link to transmit the CSI.

The subscriber terminal station 130 may include a PEP client that transmits and receives data via a satellite being installed at a subscriber end, and the PEP client may be installed as additional equipment based on equipment provided.

The satellite communication system 210 may select a new channel of a transmission layer and transmit data to a physical layer when the data is received from a backbone data server, using the resource management unit 110.

The satellite communication system 210 may receive an MODCOD corresponding to a channel status of the forward link via the physical layer, and select a channel transmitting the data based on the MODCOD. Also, the transmission layer may measure a capacity of a network through applying a slow start scheme.

The satellite communication system 210 may calculate a congestion window value of the transmission layer, using the control unit 120 as represented by Equation 1.

$$new\_ssthesh = \frac{new\_BW * RTT_{min}}{PacketSize * 8}$$ [Equation 1]

$$ssthesh = new\_ssthesh;$$

$$current\_cwnd = new\_ssthesh;$$

Here, "new_ssthesh" denotes a slow start threshold value to be newly set, "new_BW" denotes a new bandwidth to be changed based on an ACM operation, "RTTmin" denotes a minimum round trip time (RTT), and "PacketSize" denotes a size of a packet to be used in a TCP.

Also, "ssthesh" denotes a slow start threshold value to be used in a current system, and "current_cwnd" denotes a congestion window value to be used in the current system.

The transmission layer may use a maximum bandwidth capacity of a link in a satellite network in which a TCP has a long delay and a high pack loss rate, using PEP technology that enhances a TCP transmission performance. Here, the PEP may enhance a performance of an Internet protocol through applying an independent protocol to a link having a predetermined characteristic present on a transmission path or a sub network.

Figure 3:
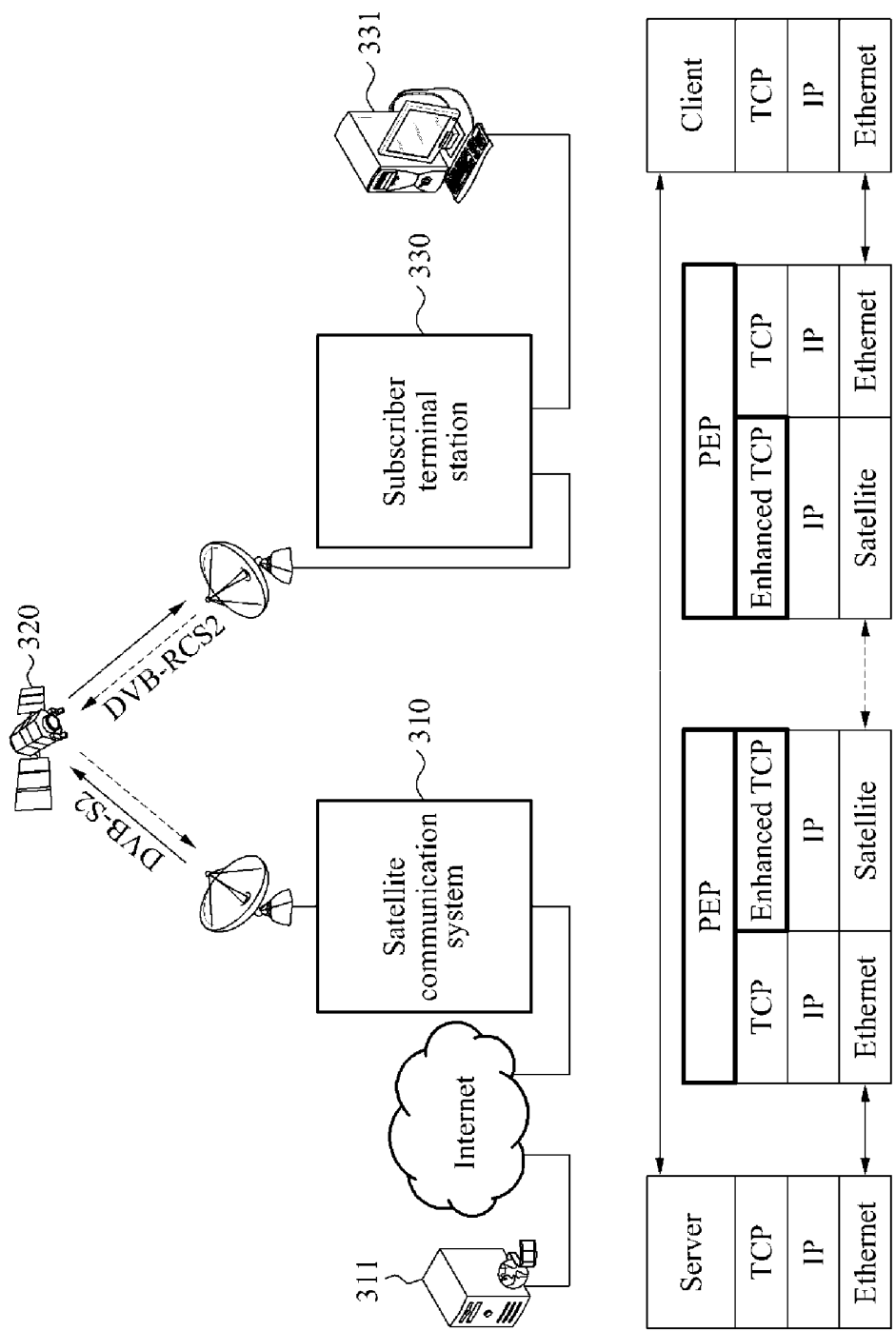
FIG. 3 is a diagram illustrating a structure of a performance enhancing proxy (PEP) communication system based on a transmission control packet (TCP) according to an embodiment of the present invention.

FIG. 3 is a diagram illustrating a structure of a PEP communication system based on a TCP according to an embodiment of the present invention.

Referring to FIG. 3, a PEP may be divided into three intervals, for example, an interval connecting an Internet service server 311 and a satellite communication system 310, an interval connecting the satellite communication system 310 and a subscriber terminal station 330 via a satellite 320, and an interval connecting the subscriber terminal station 330 and a subscriber terminal 331. The PEP may use a new TCP for enhancing a performance in a satellite link in the second TCP interval, for example, the interval connecting the satellite communication system 310 and the subscriber terminal station 330 via the satellite 320, due to being configured by three different TCPs.

Also, a PEP server corresponding to a control unit of the satellite communication system 310 may operate as a spoofer, rapidly transmitting an acknowledgement (ACK) packet to a transmitter in lieu of a receiver in order to increase a transmission window of the transmitter rapidly, and allowing the transmitter to have consistent radio transmission technology (RRT) irrespective of a satellite interval delay time beyond the PEP server.

Figure 4:
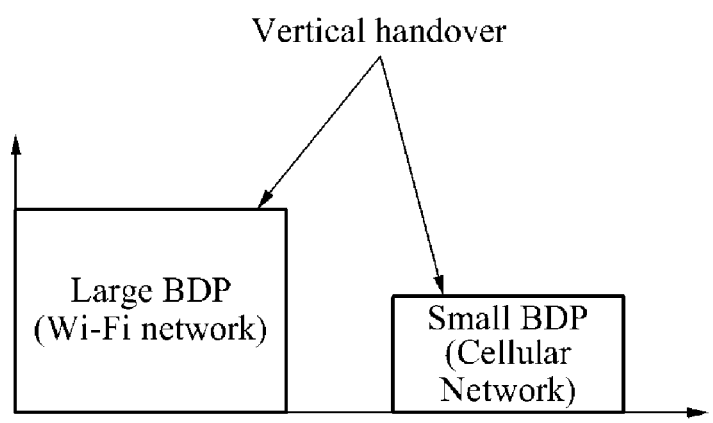
FIG. 4 is a diagram illustrating a vertical handover of a communication system according to an embodiment of the present invention.

FIG. 4 is a diagram illustrating a vertical handover of a communication system according to an embodiment of the present invention.

The satellite communication system may enhance a TCP performance in a PEP structure. For example, the satellite communication system may cause a network congestion when a moving body having a multi-interface connectable to a heterogeneous wireless network performs a vertical handover between a net having a large bandwidth delay product (BDP) characteristic and a net having a small BDP characteristic as shown in FIG. 4. However, a change in a congestion window of a TCP may be controlled through syncing a transmission layer and a physical layer.

Figure 5:
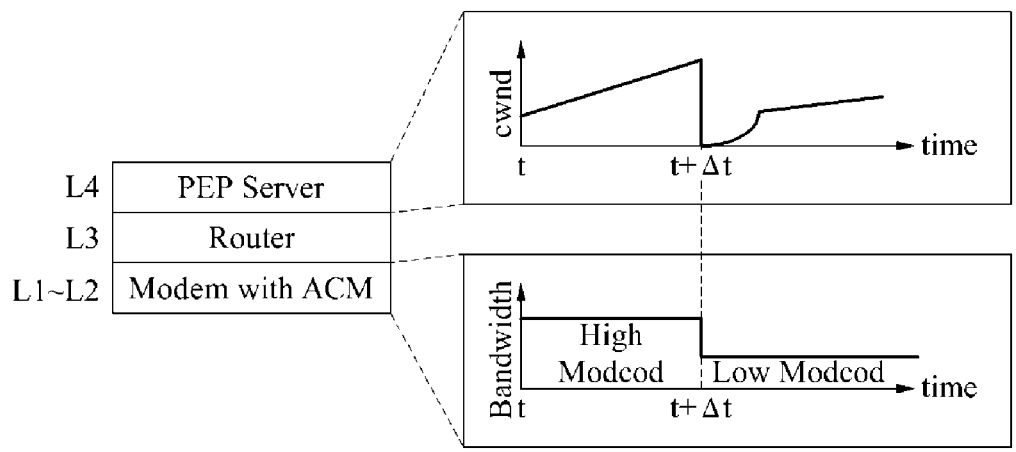
FIG. 5 is a diagram illustrating an example of a change in a TCP congestion window in response to an ACM operation according to an embodiment of the present invention.

FIG. 5 is a diagram illustrating an example of a change in a TCP congestion window in response to an ACM operation according to an embodiment of the present invention.

Referring to FIG. 5, a satellite communication system may resolve a performance degradation issue occurring at a vertical handover despite an absence of a network movement between a modem, corresponding to the transmission unit 140 of FIG. 1, supporting an ACM function that changes a bandwidth and a PEP server, corresponding to the control unit 120 of FIG. 1, managing a transmission layer protocol.

Hereinafter, a method for satellite communication, hereinafter referred to as a satellite communication method, according to an embodiment of the present invention will be described.

Figure 6:
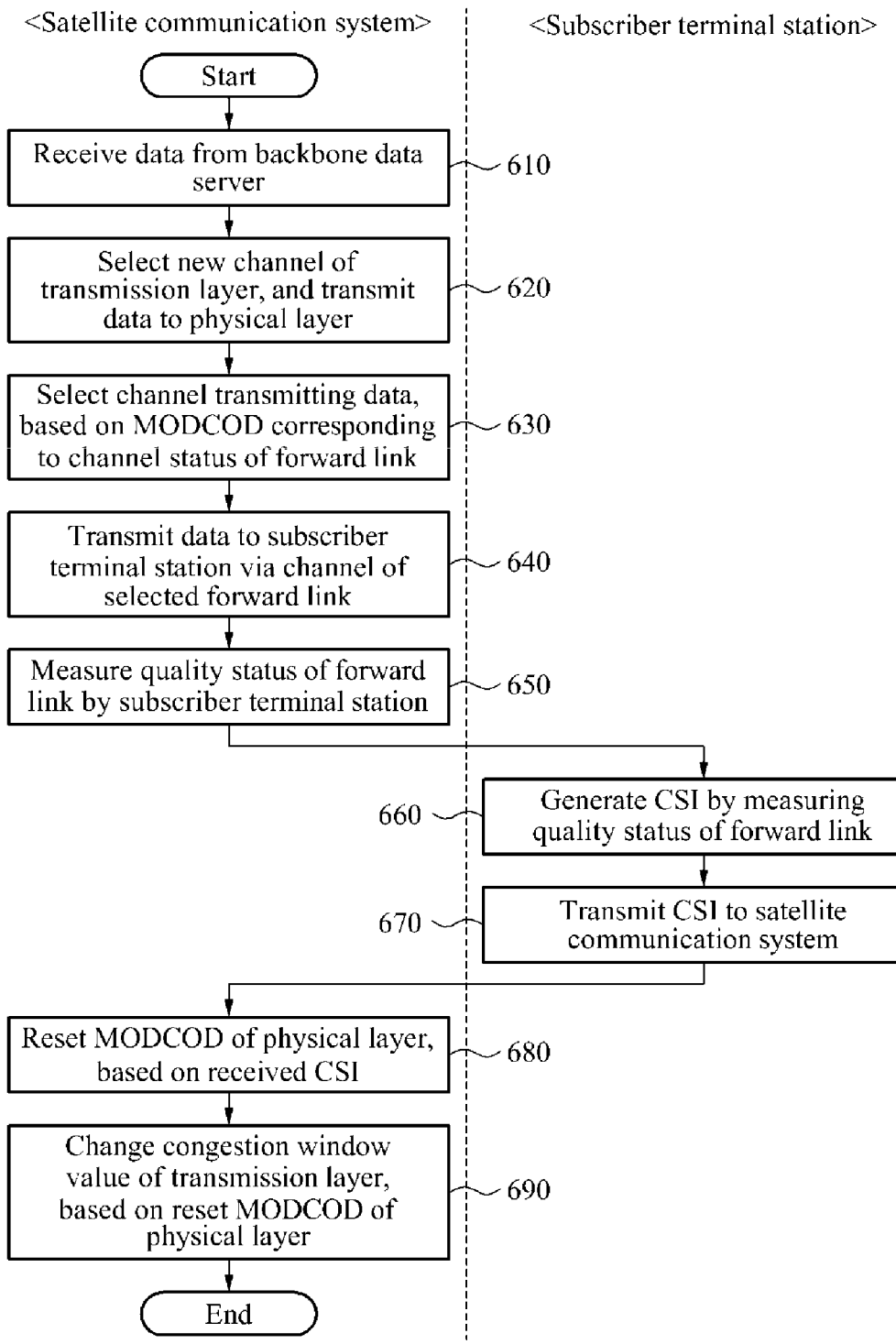
FIG. 6 is a flowchart illustrating a method for satellite communication, hereinafter referred to as satellite communication method, according to an embodiment of the present invention.

FIG. 6 is a flowchart illustrating a satellite communication method according to an embodiment of the present invention.

Referring to FIG. 6, in operation 610, a satellite communication system may receive data from a backbone data server, and in operation 620, may select a new channel of a transmission layer and transmit the data to a physical layer.

In operation 630, the satellite communication system may select a channel transmitting data based on an MODCOD corresponding to a channel status of a forward link, and in operation 640, the satellite communication system may transmit data to a subscriber terminal station via a channel of the selected forward link. Also, in operation 650, the satellite communication system may control the subscriber terminal station to measure a quality status of the forward link.

For example, the satellite communication system may end transmission of primary TCP data from a backbone data server, and transmit data using a new satellite TCP. The new satellite TCP may transmit data to a physical layer, and a forward modem of the physical layer may transmit corresponding data via the forward link through applying an ACM. Here, the applying of the ACM may receive, from a resource management unit, and select an MODCOD appropriate for a channel status of the forward link. A TCP may measure a capacity of a network through applying a slow start scheme.

In operation 660, the subscriber terminal station may measure a quality status of the forward link to generate CSI, and in operation 670, transmit the CSI to the satellite communication system.

For example, the subscriber terminal station may receive data transmitted via the forward link in a form of a signal in a physical layer, and transmit the received signal to a PEP client through demodulating. Here, the PEP client may end a secondary satellite interval TCP, and transmit data to the subscriber terminal using a tertiary TCP.

The subscriber terminal station may transmit a signal to the PEP client via the physical layer, measure a current quality status of the forward link based on the received signal, and transmit measured CSI to the satellite communication system via the return link.

In operation 680, the satellite communication system may reset an MODCOD of the physical layer, based on the received CSI, and in operation 690, change a congestion window value of the transmission layer, based on the reset value of the MODCOD of the physical layer.

For example, a reception unit of the satellite communication system, for example, a return link modem, may receive and demodulate the transmitted CSI. The resource management unit may transmit a control message reset to an MODCOD appropriate for a channel status of a current forward link to a transmission unit, for example, a forward link modem, and transmit a control message about changed CSI, for example, a bandwidth, and the like, to a corresponding transmission layer TCP. Here, the control unit may change a congestion window value as shown in Equation 2, using link change data received.

$$\text{new\_ssthesh} = \frac{\text{new\_BW} * RTT_{min}}{PacketSize * 8} \quad \text{[Equation 2]}$$

$$ssthesh = \text{new\_ssthesh};$$

$$current\_cwnd = \text{new\_ssthesh};$$

Here, "new_ssthesh" denotes a slow start threshold value to be newly set, "new_BW" denotes a new bandwidth to be changed based on an ACM operation, "RTTmin" denotes a minimum round trip time (RTT) value, and "PacketSize" denotes a size of a packet to be used in the TCP.

Also, "ssthesh" denotes a slow start threshold value to be used in a current system, and "current_cwnd" denotes a congestion window value to be used in the current system.

According to the present exemplary embodiment, it is possible to enhance a performance of a satellite communication system through exchanging information between a physical layer and a transmission layer.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for satellite communication, the system comprising:
 a resource management device to receive channel status information (CSI) of a forward link connected to a subscriber terminal station, and reset a modulation and coding (MODCOD) of a physical layer, based on the CSI received; and
 a control device to change a congestion window value of a transmission layer, based on the reset MODCOD of the physical layer,
 wherein the control device calculates the congestion window value of the transmission layer as follows, $$\text{new\_ssthesh} = \frac{\text{new\_BW} * RTT_{min}}{PacketSize * 8}$$

$$ssthesh = \text{new\_ssthesh};$$

$$\text{current\_cwnd} = \text{new\_ssthesh};,$$

wherein "new ssthesh" denotes a slow start threshold to be newly set, "new BW" denotes a new bandwidth changed based on an adaptive coding and modulation (ACM) operation, "RTTmin" denotes a minimum round trip time (RTT) value, "PacketSize" denotes a size of a packet to be used in a transport control protocol (TCP), "ssthesh" denotes a slow start threshold value to be used in a current system, and "current_cwnd" denotes a congestion window value to be used in the current system.

2. A method for controlling a system for satellite communication, the method comprising:
 receiving channel status information (CSI) of a forward link connected to a subscriber terminal station;
 resetting a modulation and coding (MODCOD) of a physical layer, based on the CSI received; and
 changing a congestion window value of a transmission layer, based on the reset MODCOD of the physical layer,
 wherein changing the congestion window value comprises:
 calculating the congestion window value of the transmission layer follows, $$\text{new\_ssthesh} = \frac{\text{new\_BW} * RTT_{min}}{PacketSize * 8}$$

$$ssthesh = \text{new\_ssthesh};$$

$$\text{current\_cwnd} = \text{new\_ssthesh};,$$

wherein "new ssthesh" denotes a slow start threshold to be newly set, "new BW" denotes a new bandwidth changed based on an adaptive coding and modulation (ACM) operation, "RTTmin" denotes a minimum round trip time (RTT) value, "PacketSize" denotes a size of a packet to be used in a transport control protocol (TCP), "ssthesh" denotes a slow start threshold value to be used in a current system, and "current_cwnd" denotes a congestion window value to be used in the current system.

3. The system of claim 1, wherein the physical layer comprises a transmission device to transmit data to the subscriber terminal station via the forward link connected to the subscriber terminal station.

4. The system of claim 1, wherein the transmission layer comprises the TCP to which a performance enhancing proxy (PEP) scheme is applied.

5. The system of claim 1, further comprising:
 a reception device to receive the CSI from the subscriber terminal station via a return link connected to the subscriber terminal station.

6. The system of claim 1, wherein the CSI is used to measure a quality status of the forward link by the subscriber terminal station.

7. The system of claim 1, wherein the resource management device transmits data to the physical layer through selecting a new channel of the transmission layer when the data is received via a backbone data server.

8. The system of claim 7, wherein the physical layer receives an MODCOD corresponding to a channel status of the forward link from the resource management device, and selects a channel transmitting the data, based on the MODCOD.

9. The system of claim 7, wherein the transmission layer measures a capacity of a network through applying a slow start scheme.

10. The system of claim 2, wherein the forward link is a satellite wireless link to which the ACM scheme is applied.

11. The method of claim 2, wherein the forward link is a satellite wireless link to which the ACM scheme is applied.

12. The method of claim 2, further comprising:
 transmitting data to the subscriber terminal station via the forward link connected to the subscriber terminal station.

13. The method of claim 1, wherein the transmission layer comprises the TCP to which a performance enhancing proxy (PEP) scheme is applied.

14. The method of claim 2, further comprising:
 receiving the CSI from the subscriber terminal station via a return link connected to the subscriber terminal station.

15. The method of claim 2, wherein the CSI corresponds to information measuring a quality status of the forward link by the subscriber terminal station.

16. The method of claim 2, further comprising:
 transmitting data to the physical layer through selecting a new channel of the transmission layer when the data is received in a backbone data server.

17. The method of claim 16, further comprising:
 receiving an MODCOD corresponding to a channel status of the forward link, using the physical layer; and
 selecting a channel transmitting the data based on the MODCOD, using the physical layer.

18. The method of claim 16, further comprising:
 measuring a capacity of a network based on a slow start scheme, using the transmission layer.

* * * * *